United States Patent
Venkatsubra et al.

(10) Patent No.: US 7,386,624 B2
(45) Date of Patent: Jun. 10, 2008

(54) METHOD, SYSTEM AND ARTICLE FOR DYNAMIC REAL-TIME STREAM AGGREGATION IN A NETWORK

(75) Inventors: Venkat Venkatsubra, Austin, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/692,124

(22) Filed: Oct. 23, 2003

(65) Prior Publication Data
US 2005/0091307 A1    Apr. 28, 2005

(51) Int. Cl.
*G06F 15/16* (2006.01)
(52) U.S. Cl. .................. 709/231; 709/220; 709/230
(58) Field of Classification Search ......... 709/230–231
See application file for complete search history.

(56) References Cited

U.S. PATENT DOCUMENTS

| | | | |
|---|---|---|---|
| 7,051,109 B1 * | 5/2006 | Stewart et al. | 709/230 |
| 7,111,035 B2 * | 9/2006 | McClellan et al. | 709/201 |

OTHER PUBLICATIONS

R. Stewart et al. Request for Comments: 2960 "Stream Control Transmissiion Protocol", Oct. 2000, Network Working Group, The Internet Society, 134 pages.*

* cited by examiner

*Primary Examiner*—Ario Etienne
*Assistant Examiner*—Michael C Lai
(74) *Attorney, Agent, or Firm*—Dillon & Yudell LLP

(57) ABSTRACT

A graphic user interface of a network client (106) includes a stock ticker from a stock server (110) and a news sidebar from a news server (112) over the IP addresses advertised to the client (106) in its list of mutli-homed addresses from the video server (104) specified under Stream Control Transmission Protocol (SCTP). The client accepts real-time data from the stock exchange server and the news agency server on the multi-homed IP addresses designated in the association with the video server (104) without knowing that the data is coming from a different source than the video server (104). The real-time data feeds from the video, stock and news servers are aggregated on the client (106) with enhanced speed because the feeds come directly to the client and not via the video server. The operating systems of the home server and remote servers utilize SCTP and specialized commands to implement the enhanced speed of real-time data aggregation being streamed to network clients without requiring modifications to existing client systems.

3 Claims, 7 Drawing Sheets

TSN TABLE

| Server | Stream ID | TSN Range |
|---|---|---|
| Home Server | 0 | 10,000 - 12,999 |
| Remote Server 1 | 1 | 13,000 - 15,999 |
| Remote Server 2 | 2 | 16,000 - 19,999 |

400

401

600
Prior Art

METHOD, SYSTEM AND ARTICLE FOR DYNAMIC REAL-TIME STREAM AGGREGATION IN A NETWORK

TECHNICAL FIELD

The present invention is related in general to data transfers in data processing system networks, and in particular to transfer of data blocks over the Internet or similar networks. Still more particularly, the present invention relates to aggregation of multiple data streams from multiple sources to a single client within the network.

BACKGROUND

Networks provide for transmission of information from a source to a destination over a particular route. The information is transmitted along the route through routers, and in accordance with a particular protocol. The Internet has become a particularly important network for transmission and distribution of data (text, code, image, video, audio, or mixed) and software. Users connect to the backbone of the Internet and other networks with broadly divergent levels of performance, ranging from 14.4 Kb/s to more than 45 Mb/s.

There are applications where clients within the network receive various types and sources of information as real-time data inputs to an application that is presented as a single composition to a user on a graphical user interface. This is accomplished by the real-time data being aggregated at a common point such as an application server, and then fed as aggregated data directly to the client device. An example of a network system providing a client aggregated video data from multiple sources is shown in FIG. 6. The video server receives stock information from the stock server over link 1 and receives news data from the news server over link 2. The video server then aggregates the stock ticker and news sidebar information into a composite video screen that is communicated to the client over link 3.

As will be appreciated, aggregating the news information and stock information at the video server and then forwarding to the client adds to the delay of the client getting real-time data. Nonetheless, the added delay has heretofore been accepted as necessary to maintain the video processing necessary to build the video screens on the video server, and not further burdening the client with tasks of aggregating data from multiple sources and building the video image from the sources. However, it would be preferable for the client to receive the video instructions for building the screen directly from the video server, but to receive the news and stock data directly from the news and stock servers, thereby decreasing the delay in receipt of the real-time data.

SUMMARY OF THE INVENTION

In accordance with the present invention, improved methods, systems and articles of manufacture in a home data processing system (home) for managing transport of a data stream over a communication link from a remote data processing system (remote) to a client data processing system (client) within a network are disclosed. One preferred method of the present invention comprises the steps of creating an association between the client and home for transfer of a plurality of data streams between the client and home as a function of a plurality of addresses of the home and remote, and instructing the remote to transfer a remote data stream to the client using one or more of the plurality of addresses of the remote used to create the association such that the client receives the remote data stream within the association.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In a preferred embodiment, a home server is controlling the aggregation of multiple data streams in real-time from multiple remote servers at the network interface of a network client for consumption by a client application. An SCTP association is created between the home server and client specifying multiple valid source-IP-addresses in accordance with the SCTP multi-homing feature, wherein at least one or more of the source IP addresses sent to the client is associated with a plurality of remote servers and the home server. The home server communicates with the remote servers using UDP packets to instruct the remote servers to deliver the requested real-time data on the designated IP addresses directly to client. Each remote server then creates a local endpoint for a SCTP connection with the client, without requiring the standard initiation procedure for creating a SCTP association (i.e. INIT and INIT ACK messages are not passed). Thereafter, the home server and remote servers deliver real-time data for the same aggregating application over a link on a secondary IP address designated within the multi-home address list on the client, while the client operates believing that the data has a single source at the home server.

Figure 1:
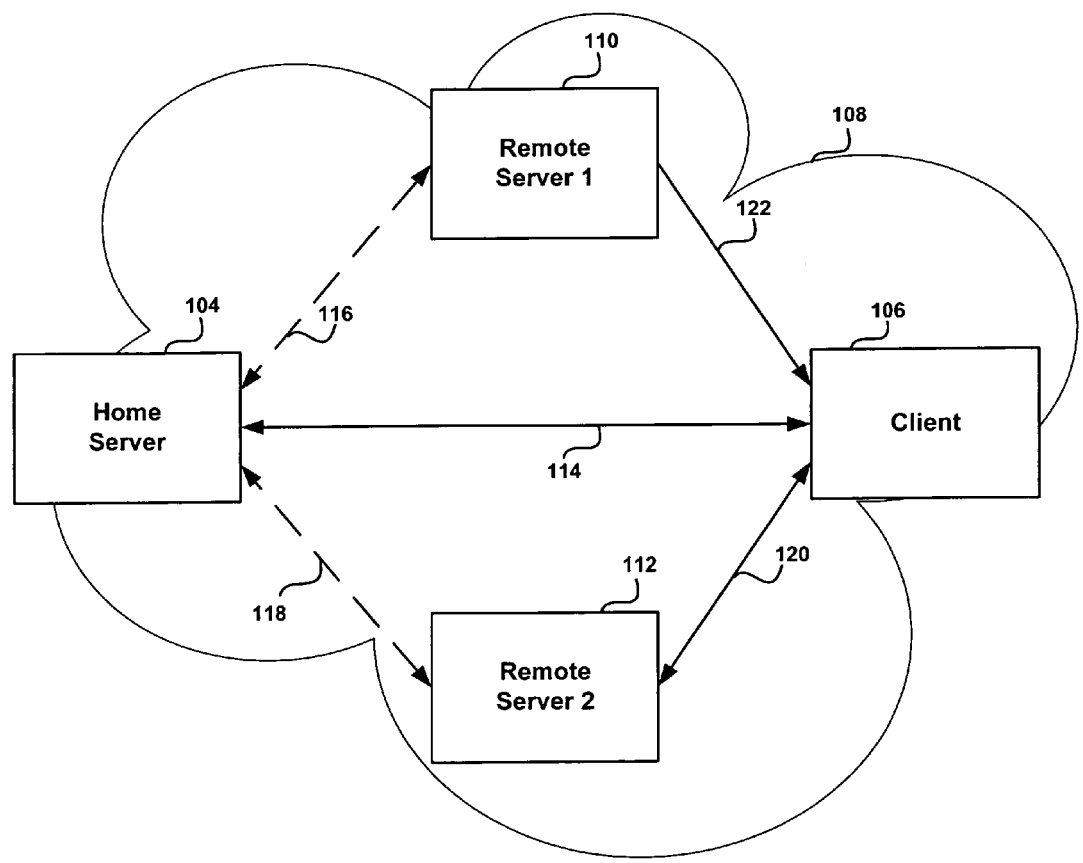
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes at least one home server system 104 coupled to at least one client system 106 via at least one network 108 such as the Internet. Data processing system network 102 further includes two or more remote server systems 110, 112 coupled to client system 106 and home server 104 via the network 108. As will be appreciated, while only a single home server system 104, two remote servers 110, 112 and a single client system 106 are shown, data processing system network 102 may include any number of home server, remote server and client systems (not shown) interconnected by one or more connections and networks, including network 108.

In the preferred embodiment shown in FIG. 1, client 106 is running an application that requires real-time data flow from multiple remote sources being managed by home server 104. In accordance with the preferred embodiment, home server 104 is controlling the aggregation of multiple data streams in real-time from multiple remote servers 110, 112 at the network interface of client 106 for consumption by a client application. By providing the functionality of the present invention through home server 104 and remote servers 110, 112, client 106 does not need to possess the capability to aggregate the multiple data streams itself. In one embodiment, home server 104 is a video server controlling real-time data for presentation on a user screen at client 106.

In order to transfer data over a network, it is necessary to have a set of rules so that every portion of the transfer sequence is properly executed. Each of these rules is called a protocol, and a set of rules is called a protocol suite. Data transfers between the home server system 104, remote servers 110,112 and client system 106 conform to a variety of protocols, including the SCTP/IP specification (RFC 2960), TCP/IP specification (RFC 793), UDP/IP specification (RFC 768) as well as File Transfer Protocol (FTP), HyperText Transfer Protocol (HTTP), or some similar communications protocol. Although originally developed by independent research groups, most network protocols are open (non-proprietary) standards, many of which are published as a series of numerically-ordered RFC (Request for Comment) papers. For example, the IP protocol is RFC 791. The RFC papers and other detailed descriptions of these protocols are readily available on the Internet or at various libraries.

Transmission Control Protocol/Internet Protocol (TCP/IP) has become a widely implemented standard communication protocol in Internet and Intranet technology, enabling broad heterogeneity between clients, servers, and the communications systems coupling them. Internet Protocol (IP) is the network layer protocol and Transmission Control Protocol (TCP) is the transport layer protocol. At the network level, IP provides a "datagram" delivery service. TCP builds a transport level service over the datagram service to provide guaranteed, sequential delivery of a byte stream between two IP hosts. Other commonly used transfer protocols include User Datagram Protocol (UDP), which defines a connection-less datagram service, and the Stream Control Transmission Protocol (SCTP), which provides a connection-oriented, reliable transport service that permits multi-streaming and multi-homing functionality. Although distinct, each of these network protocol suites are similar in structure, comprising a set of layers, with each layer responsible for a different facet of the communication task. For simplicity, the discussion below will primarily pertain to the use of the invention when using the SCTP/IP and UDP/IP protocols. However, it should be recognized by those skilled in the art that the invention can also be applied to various other network protocols as well.

In a preferred embodiment, home server 104 utilizes SCTP commands to configure client 106 to receive the aggregated data streams from home server 104 and remote servers 110, 112. SCTP ensures the complete concurrent transmission of several streams of data (in units called messages) between connected endpoints. The multi-streaming function provided by SCTP allows data to be partitioned into multiple streams that have the property of being delivered independently, so that message loss in any of the streams will only affect delivery within that stream, and not in other streams. SCTP also supports multi-homing, which means that a connected endpoint can have alternate IP addresses associated with it in order to route around network failure changing conditions. In accordance with the preferred embodiment, client 106 initiates a SCTP association with home server 104 over connection link 114 by issuing an initiation command (INIT) to home server 104. By a predefined relationship, specified application or a special option communicated to the home server 104, the home server 104 recognizes that the association will require a real-time data stream of aggregated data from one or more remote servers on the network.

In response to receiving an INIT message requesting an initiation of an SCTP association, home server 104 sends a response initiation acknowledge (INIT ACK) message to client 106 at the source address specified in the INIT command. If the client application will be consuming aggregated data from remote servers, home server 104 sends an INIT ACK message to client 106 over link 114 specifying multiple valid source-IP-addresses in accordance with the SCTP multi-homing feature, wherein at least one or more of the source IP addresses sent to the client is associated with each remote server 110, 112 and the home server 104. Client 106 stores these IP addresses in its multi-homed address list for receiving real-time data streams.

Figure 2A:
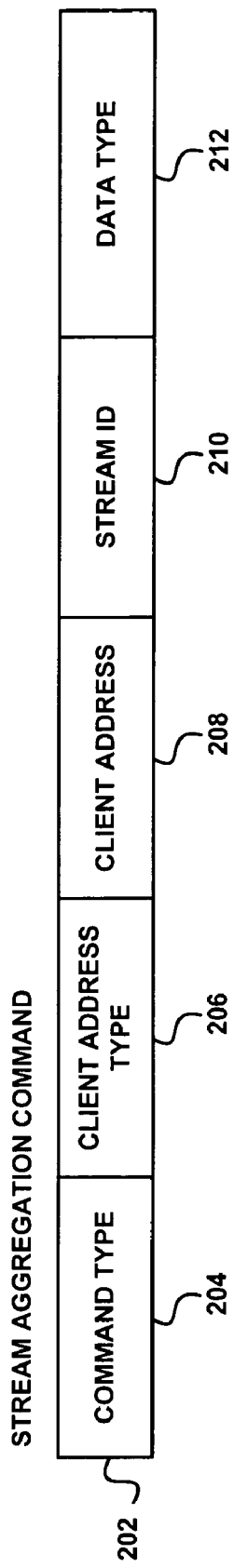
FIG. 2A shows the format of the stream aggregation (SA) command in accordance with a preferred embodiment of the present invention.

Home server 104 communicates with remote servers 110, 112 over links 116 and 118 using UDP packets to instruct remote servers 110 and 112 to deliver the requested real-time data on the designated IP addresses directly to client 106. A first set of UDP packets sent to remote servers 110, 112 have payloads containing a stream aggregation (SA) command that is interpreted and executed by the remote server's operating system in accordance with the preferred embodiment. FIG. 2A shows the format of the SA command. SA command 202 contains a Command Type 204, specifying the UDP payload as a SA command, a Client Address Type 204, specifying IPv4 or IPv6, for example, Client Address 208, specifying the IP address of the client 106 for receiving the streaming data, Stream ID 210, specifying the remote server's designated Stream ID for the association with the client 106, and Data Type 212, specifying the application data that is being requested by the consuming application on client 106. The SA command notifies the remote servers of the multi-homed association and instructs the remote servers to transmit the requested real-time data directly to the client. In response to the SA command, each remote server 110, 112 then creates a local endpoint for a SCTP connection with the client 106, without requiring the standard initiation procedure for creating a SCTP association (i.e. INIT and INIT ACK messages are not passed).

Figure 2B:
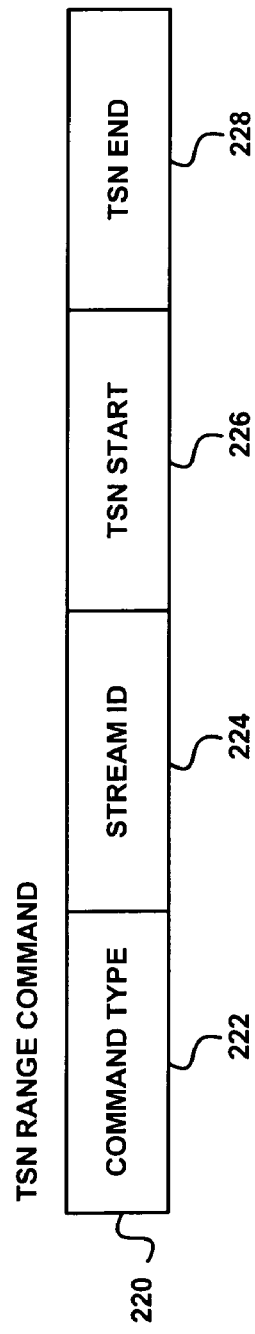
FIG. 2B shows the format of the Transmission Sequence Number Range (TSNR) command in accordance with a preferred embodiment of the present invention.

Home server 104 then sends a second set of UDP packet to each remote server 110, 112 having a payload containing a TSN Range (TSNR) command in accordance with the preferred embodiment. FIG. 2B shows the format of the TSNR command. TSNR command 220 contains a Command Type 222, specifying the UDP payload as TSNR command, a Stream ID 224, specifying the remote servers designated Stream ID for the association with the client 106, TSN Start 226, specifying the TSN starting number for the message sequence, and TSN End 228, specifying the last transmission sequence number in the permitted range for transmission by that remote server. The TSNR command instructs the receiving remote server on the Transmission Sequence Number (TSN) range of numbers that the remote server should utilize to transmit the streaming data to the client 106. As will be appreciated, the SA and TSNR commands can be combined into a single command or UDP payload in alternative embodiments.

Thereafter, home server 104 transmits data for the aggregating application on client 106 over link 114 associated with a primary IP address. Remote server 112 delivers real-time data for the same aggregating application over link 120 on a secondary IP address designated within multi-home address list on client 106. And, remote server 110 delivers real-time data for the same aggregating application over link 122 on a secondary IP address designated within multi-home address list on client 106.

The data exchange in SCTP follows the TCP's Selective ACK procedure (SACK), whereby receipt of DATA messages is acknowledged by sending a SACK message, which indicates not only the cumulative TSN range received, but also any non-cumulative TSNs, displaying gaps in the received TSN sequence. The SCTP messages delivered over links 120 and 122 would provide the data streams identified by the Stream ID/Stream Sequence Number pair on the IP addresses identified for the current association between the client 106 and the home server 104. This permits all remote sources of data to send the real-time data directly to the client, while the client operates believing that the data has a single source at home server 104. Upon receiving each data message (DATA) from each of the data links 114, 120, and 122, client 106 responds with a selective acknowledgement (SACK) back to the source address contained in the received data message.

Figure 3:
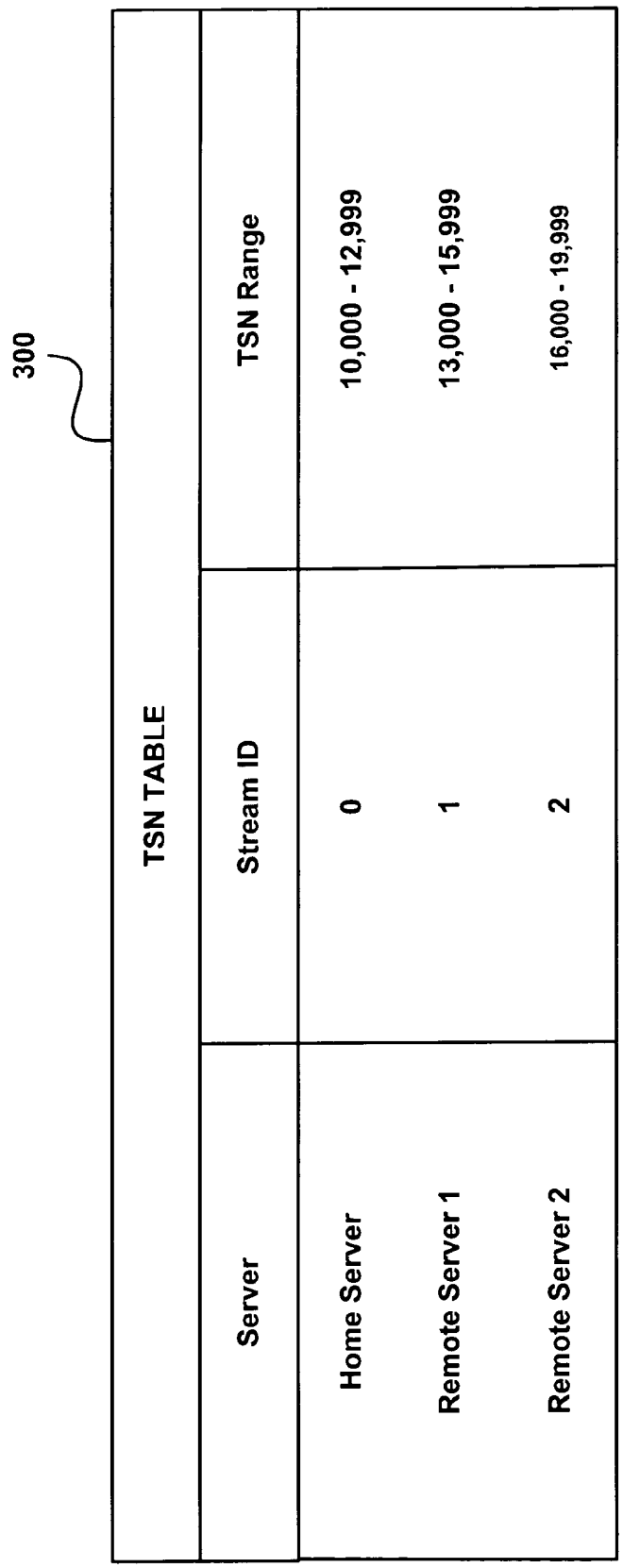
FIG. 3 depicts a Transmission Sequence Number (TSN) table stored within the memory of home server in accordance with a preferred embodiment of the present invention.

Home server 104 maintains a table in its memory to keep track of the allocated TSN ranges for each of the remote servers transmitting real-time data streams in the association with the client 106. For example, FIG. 3 depicts a TSN table 300 stored within the memory of home server 104. TSN table 300 includes an entry identifying the Stream ID and the allocated TSN range for each of the home server, remote server 1, and remote server 2 (as seen in FIG. 1). In the example shown in FIG. 3, home server 104 has allocated within the TSN table the range 10000 to 12999 as reserved for itself. The table further identifies a TSN range for remote server 1 from 13000 to 15999 and a TSN range for remote server 2 from 16000 to 19999. Each of these ranges are communicated to remote servers 110, 112 via a TSNR command 220 for each of the remote servers.

Because the client will respond with a SACK to the source address of the server specified in the SCTP header, the sending remote server will receive the SACK and forward the acknowledgment to the home server 104 over links 116, 118, so that the home server 104 can update its TSN table 300 in its memory to indicate the allocated TSN ranges. If the cumulative TSN used by a particular remote server has crossed the server's allocated TSN range as indicated in the home server's TSN table, then home server 104 will allocate a new range of TSN numbers for that remote server based on the next available set of transmission sequence numbers. After updating TSN table 300 with the new range of transmission sequence numbers for the given remote server, home server 104 would then issue a TSNR command 220 to the remote server specifying the new TSN range for that remote server.

In an example of a preferred embodiment, a cumulative screen shown on the graphic user interface of client (106) includes a stock ticker from a stock server (110) and a news sidebar from a news agency on a news server (112) over the IP addresses advertised to the client (106) in its list of mutli-homed addresses from the video server (104). The client will accept the data from the stock exchange server and the news agency server on the multi-homed IP addresses designated in the association with the video server (104) without knowing that the data is coming from a different source than the video server. The real-time data feeds from the video, stock and news servers are aggregated on the client (106) with enhanced speed because the feeds come directly to the client and not via the video server. It will be appreciated that because the client operates using standard SCTP, the client system does not need to be modified in any manner to utilize the present invention. The operating systems of the home server and remote servers utilize SCTP and specialized commands to implement the preferred embodiment of enhanced speed for the aggregation of real-time data being streamed to network clients.

Figure 4A:
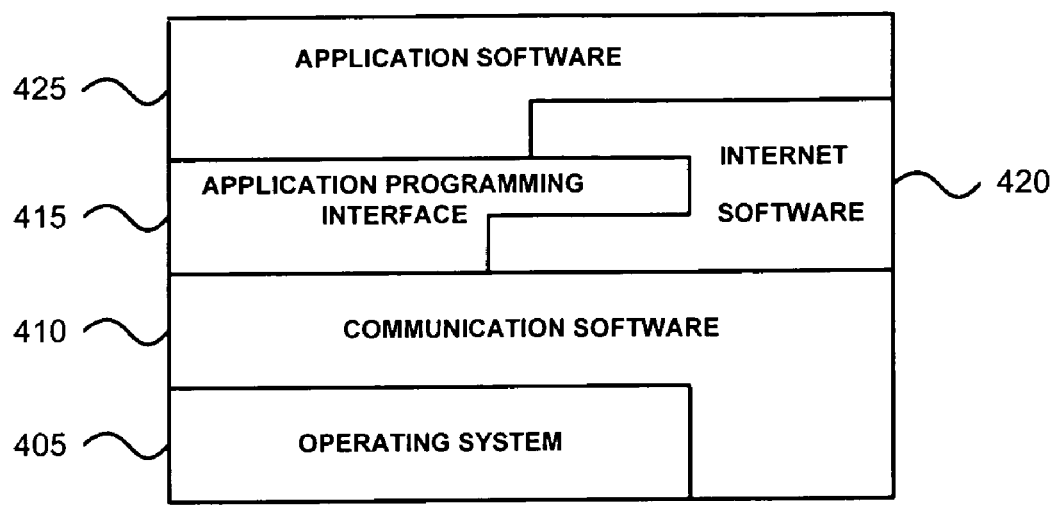
FIG. 4A is a depiction of a typical software architecture for a server-client system, as may be utilized in a preferred embodiment of the present invention.

FIG. 4A is a depiction of a typical software architecture for a server-client system, as may be utilized in a preferred embodiment of the present invention. Server 104 and client 106 are each architected with software architecture 400. At the lowest level, an operating system 405 is utilized to provide high-level functionality to the user and to other software. Such an operating system typically includes a BIOS (Basic Input Output System). Communication software 410 provides communications through an external port to a network such as the Internet via a physical communication link by either directly invoking operating system functionality or indirectly, bypassing the operating system to access the hardware for communications over the network. The application programming interface 415 allows the user of the system, be it an individual or a software routine, to invoke system capabilities using a standard consistent interface without concern for how the particular functionality is implemented. The Internet software 420 represents any one of several standard commercial packages available for equipping a computer with Internet functionality. The application software 425 represents any number of software applications designed to react to data through the communications port to provide the desired functionality the user seeks. Applications at this level may include those necessary to handle data, video, graphics, photos or text, which can be accessed by users of the Internet.

Figure 4B:
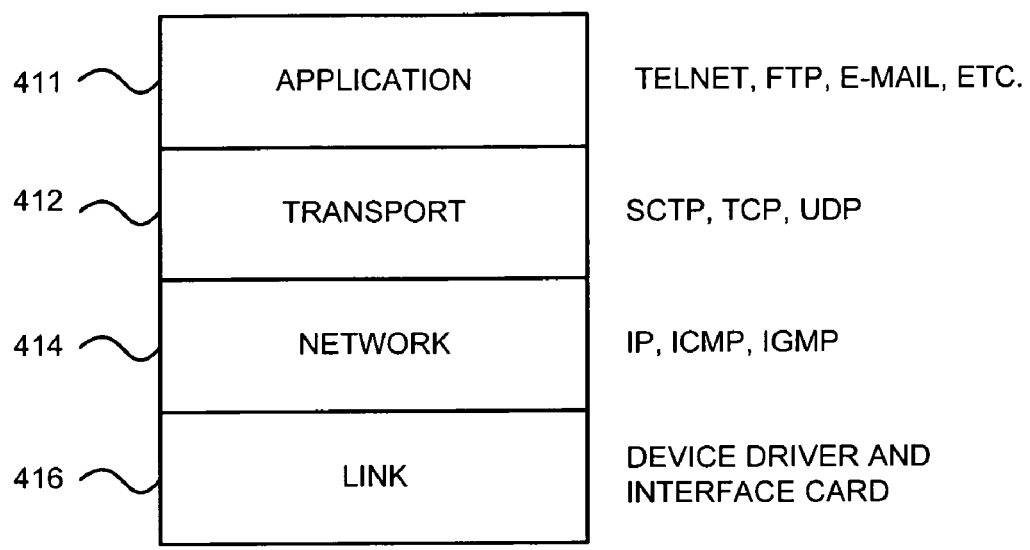
FIG. 4B is a depiction of a 4-layer communications architecture for a network, as may be utilized in a preferred embodiment of the present invention.

As shown in FIG. 4B, SCTP/IP and similar protocols are utilized by a 4-layer communications architecture 401 for the network comprising an application layer 411, a transport layer 412 a network layer 414, and a link layer 416. Each layer is responsible for handling various communications tasks, as follows. The link layer 416 (also referred to as the data-link layer or the network interface layer) normally includes the device driver in the operating system and the corresponding network interface card in the computer. Together they handle all the hardware details of physically interfacing with the network media being used, e.g. Ethernet cable, etc. The network layer 414 (also referred to as the internet layer) handles the movement of packets of data around the network. For example, the network layer handles the routing of the various packets of data that are transferred over the network. The network layer in the SCTP/IP suite is comprised of several protocols, including IP (Internet Protocol), ICMP (Internet Control Message Protocol), and IGMP (Internet Group Management Protocol). The transport layer 412 provides an interface between the network layer 414 and the application layer 411 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. The application layer 410 handles the details of the particular application. When an application sends data using SCTP/IP, the data is sent down a protocol stack, through each layer, until it is sent as a stream of bits across the network.

Figure 5:
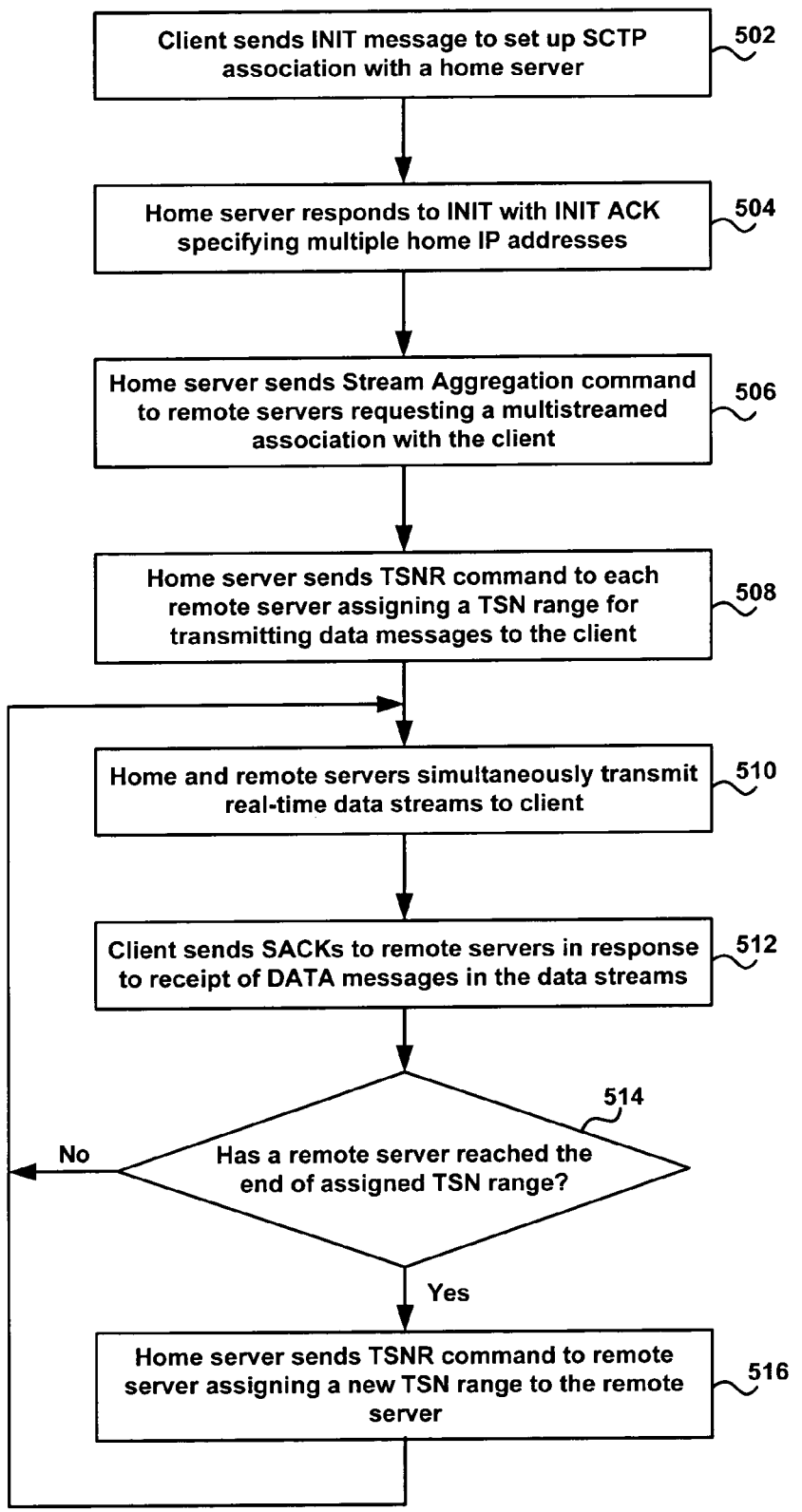
FIG. 5 shows a flow diagram of the process for dynamic real time stream aggregation for clients, in accordance with a preferred embodiment of the present invention.
Figure 6:
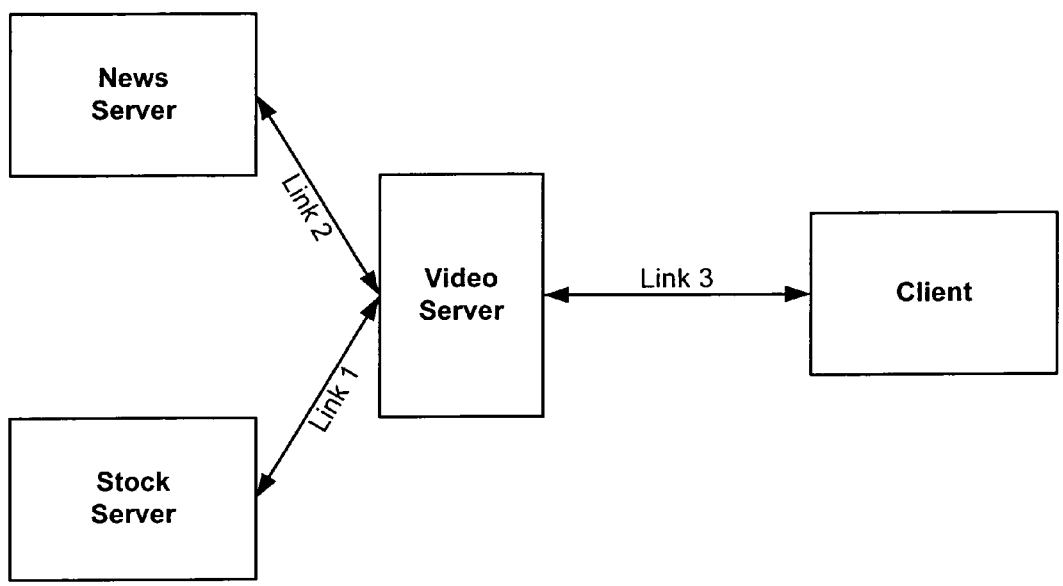
FIG. 6 shows a block diagram of a network system in the prior art providing a client aggregated video data from multiple sources.

With reference now to FIG. 5, there is shown a flow diagram of the process for dynamic real time stream aggregation for clients, in accordance with a preferred embodiment of the present invention. Process 500 begins at step 502 when a client sends a INIT message to the home server requesting that the home server setup a SCTP association for the transmission of real-time data from multiple sources remote from the home server. At step 504, the home server responds to the INIT message with a INIT ACK specifying multiple home IP addresses for a multi-homed SCTP association, wherein the IP addresses includes IP addresses for the remote servers. At step 506, the home server sends a stream aggregation (SAN) command to the remote servers requesting a multi-streamed association be substantiated in the remote servers with the client. At step 508, the home server then sends a transmission sequence number range (TSNR) command to each of the remote servers specifying each server's TSN range for transmission of data messages to the client.

At step 510, the home and remote server simultaneously begin to transmit real-time data streams to the client utilizing the stream IDs and TSN SEQUENCES specified and allocated to each within the TSN table in the home server and reported to each of the remote servers in the SA and TSNR commands. The client receives each of the data streams on IP addresses specified in the multi-homed address table provided by the home server so each stream is assumed to be directed from the home server as part of the data streams being consumed on the application's running on the client. At step 512, the client sends SACKs to each of the remote servers and the home server in response to receipt of DATA messages transmitted within the data streams from each of the remote and home servers. At decision block 514, it is determined if the received SACKs have identified received message having TSNs at the end of a remote server's allocated TSN range. If not, the process returns to step 510, where the home and remote servers continue to transmit the real-time data streams to the client within their assigned TSN ranges. If it is determined at step 514 that the remote server has reached the end of its assigned TSN range, the process proceeds to step 516, where the home server sends a TSNR command to the remote server assigning a new TSN range to the remote server for continued transmission of the real-time data streams. The process then returns to step 510, where the remote server continues to transmit the real-time data stream to the client.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While this invention is described in terms of the best mode for achieving this invention's objectives, it will be appreciated by those skilled in the art that variations may be accomplished in view of these teachings without deviating from the spirit or scope of the present invention.

What is claimed is:

1. A method in a data stream aggregation server for managing transport of multiple data streams from multiple distinct real-time data source servers to a client within a network, said method comprising the steps of:

receiving at said data stream aggregation server an initiation command that specifies a real-time data transfer association between the client and the data stream aggregation server for transfer of a plurality of data streams between the client and data stream aggregation server, wherein said data transfer association conforms to a transmission protocol enabling concurrent transmission of multiple related data streams to be delivered independently such that data loss in any of the multiple related data streams does not affect delivery of data in the other data streams, said transmission protocol further enabling multi-homing in which a single connected endpoint of the data transfer association has multiple alternate addresses; and responsive to said initiation command:
providing each of the data source servers with a range of mutually unique transmission sequence numbers and instructing the data source servers to transmit the data streams within their respective ranges;
responsive to receiving an acknowledgement from one of the data source servers indicating that the client has received a data stream within one of the provided ranges:
providing the one of the data source servers with a new range of transmission sequence numbers; and
instructing the one of the data source servers to transmit the data stream within the new range.

2. The method according to claim 1, wherein the data transfer association is created as a Stream Control Transmission Protocol (SCTP) association and the multiple source addresses are specified to the client as IP addresses of the data stream aggregation server using the multi-homed feature of the transport protocol.

3. The method according to claim 2, wherein the step of sending stream aggregation commands includes providing each of the data source servers with a stream identification number and an IP address for the client.

* * * * *